(12) United States Patent
Emery et al.

(10) Patent No.: US 10,974,173 B1
(45) Date of Patent: Apr. 13, 2021

(54) PORTABLE DRAINAGE SYSTEM FOR BULK GRANULAR MATERIALS

(71) Applicant: R.T.D. Enterprises, Madison, ME (US)

(72) Inventors: Troy W Emery, Madison, ME (US); Robbie W Emery, Madison, ME (US); Karl V Krotzer, Cleveland, OK (US); Jacob L Baumler, Cleveland, OK (US)

(73) Assignee: R.T.D. Enterprises, Madison, ME (US)

( * ) Notice: Subject to any disclaimer, the term of this patent is extended or adjusted under 35 U.S.C. 154(b) by 0 days.

(21) Appl. No.: 15/929,877

(22) Filed: May 27, 2020

(51) Int. Cl.
| | |
|---|---|
| *C02F 11/16* | (2006.01) |
| *B01D 21/00* | (2006.01) |
| *B01D 29/23* | (2006.01) |
| *F26B 9/10* | (2006.01) |
| *F26B 5/00* | (2006.01) |
| *E02B 11/00* | (2006.01) |

(52) U.S. Cl.
CPC ..... *B01D 21/0003* (2013.01); *B01D 21/0012* (2013.01); *B01D 29/23* (2013.01); *C02F 11/16* (2013.01); *E02B 11/00* (2013.01); *F26B 5/00* (2013.01); *F26B 9/10* (2013.01)

(58) Field of Classification Search
CPC .......... C02F 11/121; C02F 11/16; F26B 5/00; F26B 9/10; B01D 23/04; B01D 29/05; B01D 29/23; B01D 43/00; E02B 11/00
USPC ........ 210/747.1, 747.9, 170.01, 170.08, 482; 34/237, 511; 405/36
See application file for complete search history.

(56) References Cited

U.S. PATENT DOCUMENTS

| | | | | |
|---|---|---|---|---|
| 3,216,569 | A * | 11/1965 | Crundall | 210/482 |
| 3,847,808 | A * | 11/1974 | Spohr | B01D 24/461 |
| | | | | 210/747.1 |
| 4,382,863 | A * | 5/1983 | Riise | C02F 11/16 |
| | | | | 210/271 |
| 4,749,479 | A * | 6/1988 | Gray | B01D 29/05 |
| | | | | 210/170.08 |
| 5,536,420 | A * | 7/1996 | Oyzboyd | C02F 11/16 |
| | | | | 210/804 |
| 7,494,592 | B2 * | 2/2009 | Deskins | C02F 11/121 |
| | | | | 210/747.2 |
| 2006/0120803 | A1 * | 6/2006 | Blackwood | E02B 11/00 |
| | | | | 405/36 |

(Continued)

*Primary Examiner* — Christopher Upton
(74) *Attorney, Agent, or Firm* — Gunn Lee & Cave PC

(57) ABSTRACT

A plurality of modular units are connected together on a slightly sloped drainage field with a perforated header pipe at the lower side conveying water away from the drainage system. An impermeable flexible liner cushioned on both sides is located below the modular units. The modular units are each made up of rigid boxes that have connecting cross slots at the bottom thereof and vertical perforations there through. The rigid boxes are lined with a drainage fabric that is site specific and have an expanded geosynthetic material therein, which is held in place when filled with porous granular material. High flexural strength mats are connected together over the tops of the modular units. An air inlet pipe connects air to the cross slots, down the sloped drainage field, to the header pipe to drain water from the bulk granular material resting on the high flexural strength mats. The entire system may be quickly disassembled, moved to a different location, and reassembled with the number of modular units being changed according to the circumstances.

12 Claims, 4 Drawing Sheets

(56) References Cited

U.S. PATENT DOCUMENTS

2015/0224427 A1* 8/2015 Vickers .................. B01D 29/05
                                                       210/767
2019/0195557 A1* 6/2019 Emery ...................... F26B 9/10

* cited by examiner

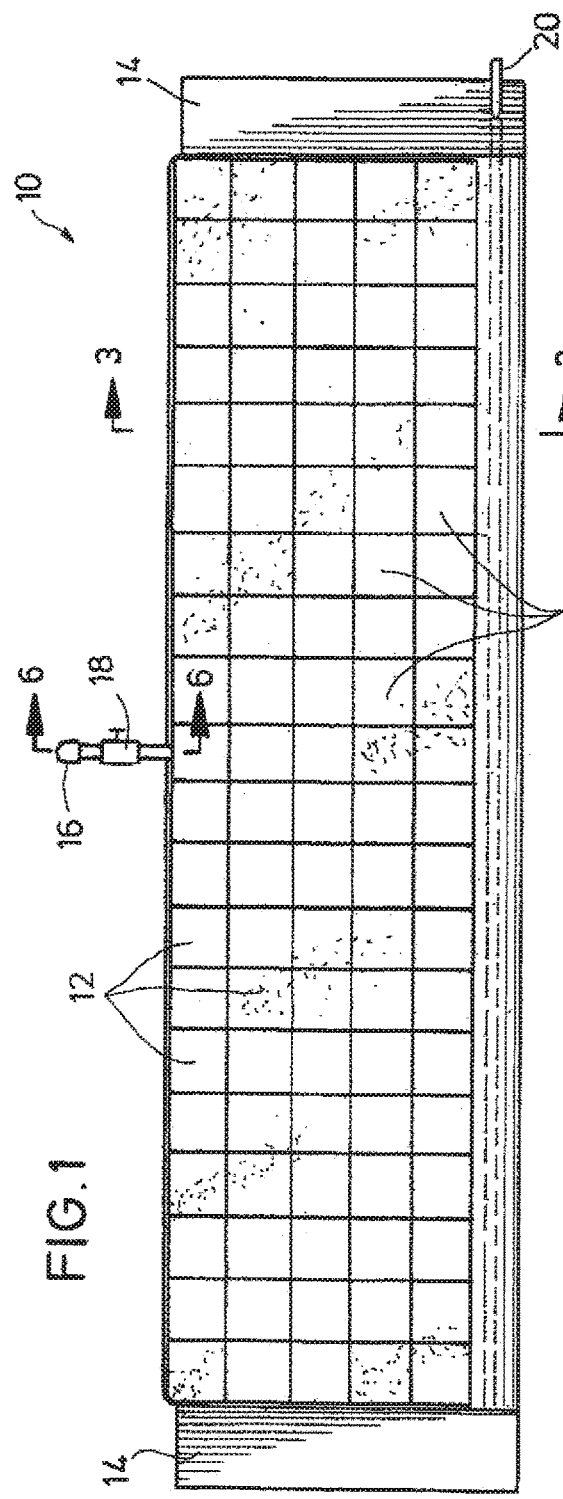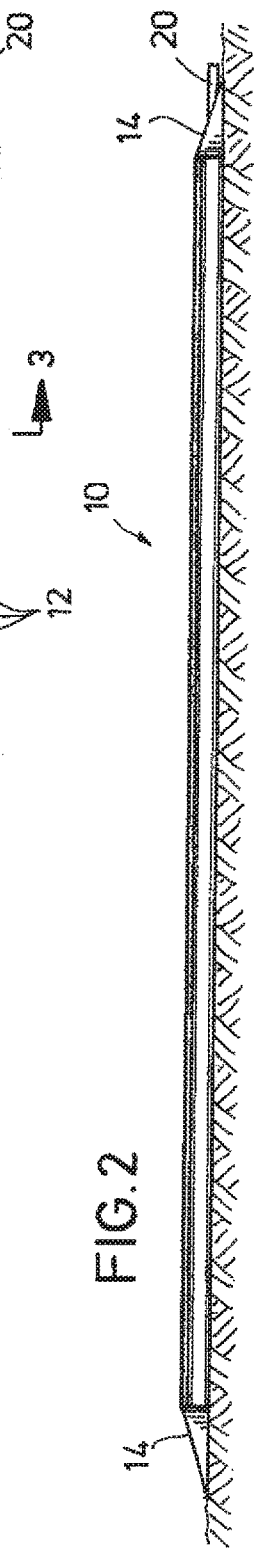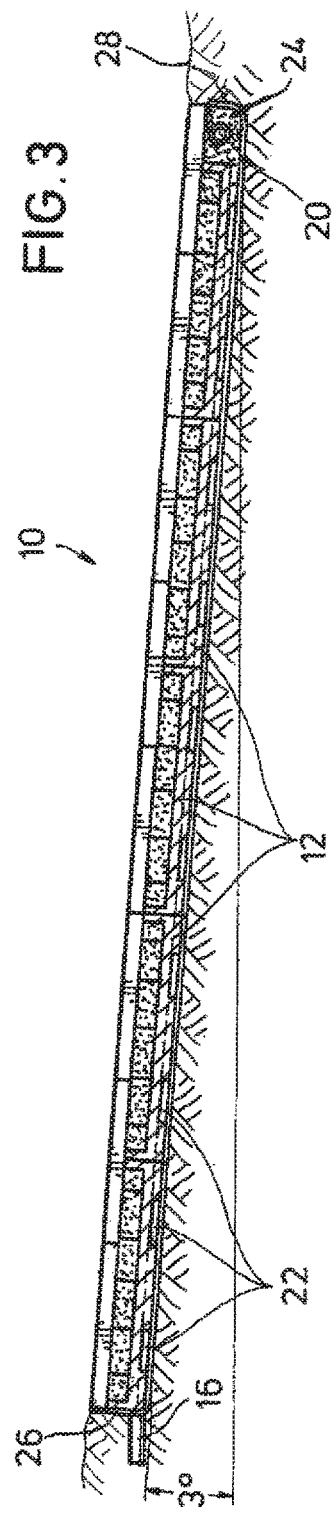

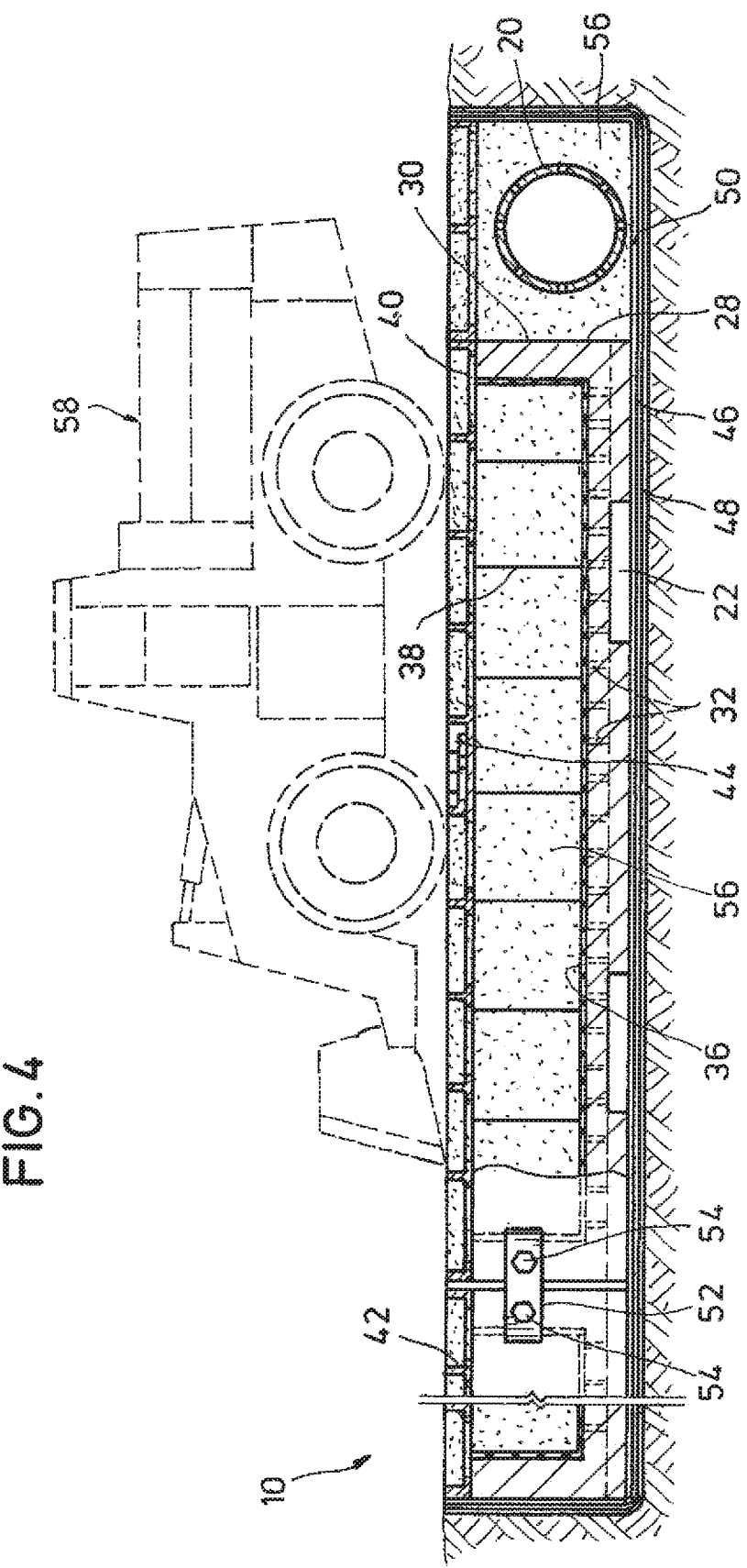

PORTABLE DRAINAGE SYSTEM FOR BULK GRANULAR MATERIALS

FIELD OF THE INVENTION

This invention relates to drainage of bulk granular material and, more particularly, to a portable system for draining bulk granular material.

BACKGROUND

After production of bulk granular material, whether by mining, crushing or some other process, many times water or other fluids needs to be removed from the bulk granular material. For example, frac sand is used in the hydraulic process known as "fracing" to produce petroleum fields. Most frac sand has a large amount of moisture which needs to be removed prior to shipping. The frac sand may be washed to remove fine particles. After washing, the frac sand is put in piles to allow the water to drain therefrom.

Other industries also require the draining of bulk granular material. For example, during coal mining, water is sprayed to control coal dust. Upon removing coal from the mine, the water needs to be removed prior to shipment. The present portable drain system can be used to remove the water from the mined coal.

There are many other types of bulk granular materials that need to be drained for removal of liquids prior to shipment. The drainage of bulk granular material is common in the construction, mining or agricultural industries. For example, after diatomaceous earth is removed from the ground, it needs to have water removed. Fertilizers, whether natural or synthetic, need to be drained and dried prior to packaging and shipment. While a heater may remove some of the final moisture content, the majority of the moisture can be removed by a drainage system. For most bulk granular materials, a majority of the moisture can be removed by the portable drainage system as shown in the present invention.

SUMMARY OF THE INVENTION

The location of a portable drainage system for bulk granular materials that incorporates the present invention is on a graded slope of approximately 2 to 3 degrees. On the downside of the graded slope is a perforated header pipe.

Uphill from and under, the perforated header pipe is an impermeable flexible liner that has a cushion layer on both sides. The cushion layers are made of non-woven geotextile material. Above the impermeable flexible liner are located a plurality of modular units that are rectangular in shape and abut each other on the sides. The outer periphery of the modular units are attached together by connecting plates.

The modular units are made up of top open rigid boxes that have connecting cross slots in the bottom thereof. The rigid boxes also have small vertical holes through the bottom. Inside of the rigid boxes is a site specific drainage fabric, which lines the inside of the rigid boxes. The site specific drainage fabric should be woven tight enough so that the granular bulk material being drained would not pass there through, but loose enough so the water or other liquids would flow there through.

Inside of the rigid boxes resting on the site specific drainage fabric is expanded geosynthetic material, which may be filled with bulk granular material from the site. An example is the Presto Geoweb Cellular Containment System, or the Neoloy Geocell System.

Over the top of multiple modular units is a high flexural strength mat, which may be connected with other high flexural strength mats to cover the entire drainage system. The high flexural strength mats are strong enough so that when resting on multiple modular units, it can support heavy equipment, such as front end loaders, that may move bulk granular material onto, and off of, the portable drainage system.

An air inlet pipe on the uphill side of the portable drainage system connects to the connecting cross slots in the bottom of the rigid boxes. A valve controls the air flow through the air inlet pipe through the connecting cross slots, and into the perforated header pipe on the low side of the graded slope at the portable drainage system. The airflow causes aspiration through the drainage system to remove water, sometimes called "decant" fluids. The decant fluids flow through the perforated header pipe to a location removed from the drainage system.

On the outside of the modular units, a ramp is provided on one or more sides so that heavy equipment such as front end loaders, can drive on top of the portable modular system. The ramps may be made of small rocks or other suitable material.

Once the portable drainage system is no longer needed at one location, it may be disassembled and moved to a new location. The one item that may have to be periodically replaced is the impermeable flexible liner; otherwise the other component parts are reusable, unless for some reason the component parts are damaged during the prior use.

BRIEF DESCRIPTION OF THE DRAWINGS

FIG. 1 is a top view of a portable drainage system.

FIG. 2 is a front view of FIG. 1.

FIG. 3 is an enlarged sectional view of FIG. 1 along section lines 3-3.

FIG. 4 is an enlarged partial view of FIG. 3.

DETAILED DESCRIPTION OF THE INVENTION

Figure 5:
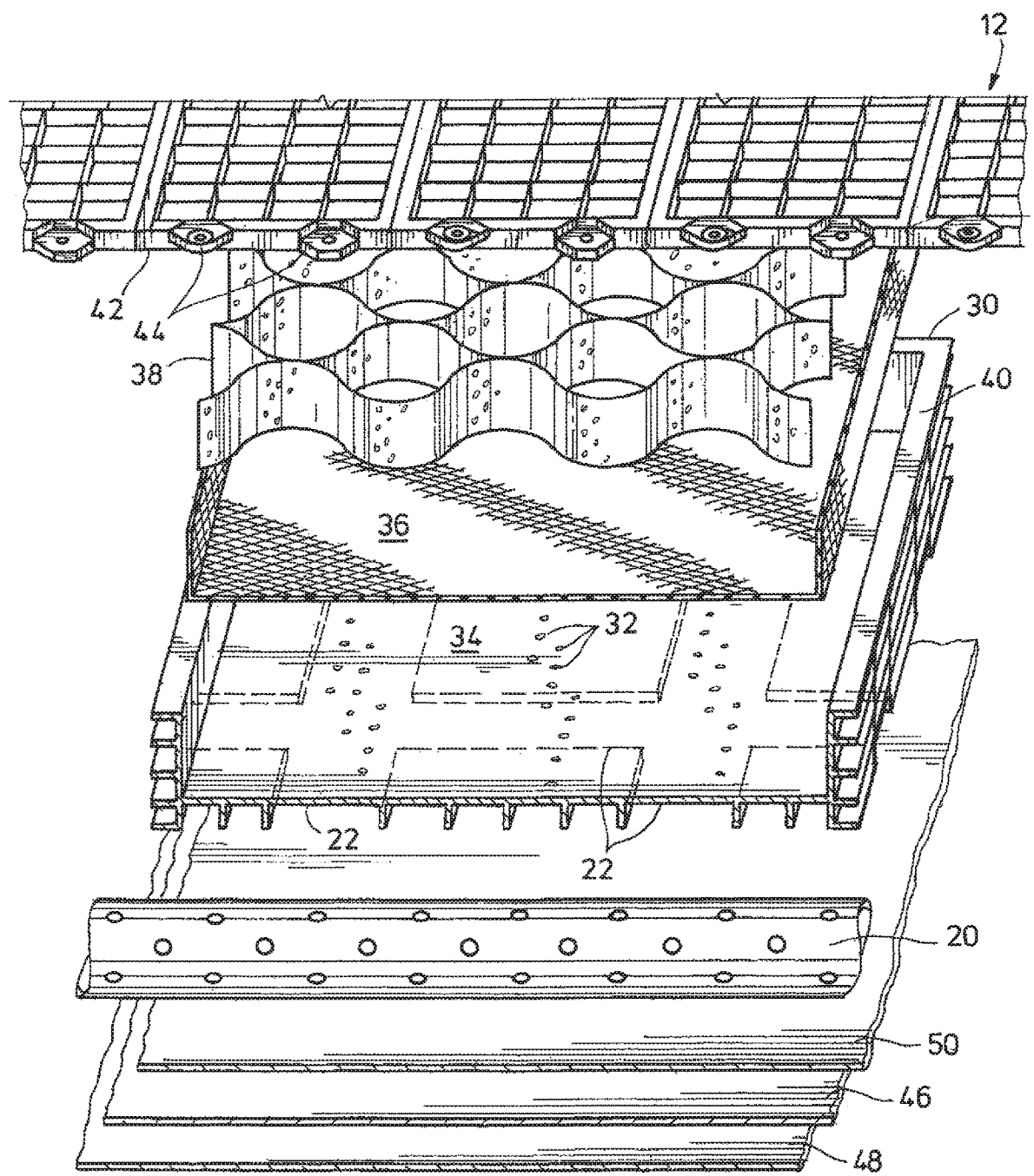
FIG. 5 is an exploded perspective view of one modular unit in FIG. 1.

A portable drainage system is illustrated in the top view shown in FIG. 10. The portable drainage system has modular units 12 that are rectangular in shape and located side by side. Ramps 14 are provided so that loading equipment such as front loaders can be driven on top of the portable drainage system 10. As will be explained in more detail subsequently, an air inlet pipe 16 connects through a valve 18, below the modular units 12, to a perforated header pipe 20. FIG. 2 is a side view of FIG. 1.

Referring to FIG. 3, an enlarged cross sectional view of FIG. 1 along section lines 3-3 is shown. The modular units 12 are located side by side with the air inlet pipe 16 providing air through connecting cross slots 22 to the perforated header pipe 20, which perforated header pipe 20 is buried in a porous granular material 24.

As illustrated in FIG. 3, a portable drainage system 10 has an upslope end 26 and a downslope end 28. On the upslope end 26 is the air inlet pipe 16 and on the downslope end 28 is the perforated header pipe 20. The slope between the upslope end 26 and the downslope end 28 is approximately 2-3 degrees.

Referring to FIG. 5, the construction of a modular unit 12 is shown in an exploded view. The modular unit 12 has a rigid box 30 which is almost 4 feet by 4 feet but not quite. Small vertical holes 32 extend through the bottom 34 on the rigid box 30. In the bottom 34 of the rigid box 30 are the connecting cross slots 22.

Within the rigid box 30 is a site specific drainage fabric 36. The site specific drainage fabric 36 should be a tight enough weave so the granular material being drained will not pass there through, but not so tight that water or other fluids will not drain there through. The site specific fabric 36 extends up the inside walls of the rigid box 30, the upper edges of which may be held in position against the inside of the rigid box 30 by any convenient means such as snaps.

Inside of the rigid box 30 and the site specific drainage fabric 36 is located a four inch cellular confinement, also referred to as expanded geosynthetic material 38. The expanded geosynthetic material 38 extends upward to the top 40 of the rigid box 30. Filled within the expanded geosynthetic material 38 also to the top 40 of the rigid box 30 is sand (not shown), or whatever porous granular material 56 is available at the site. See FIG. 6.

Extending across the top 40 of multiple rigid boxes 30 is a high flexural strength mat 42, such as those sold under the trademark Geoterra®. The high flexural strength mats 42 may be connected to adjacent high flexural strength mats 42 by connecting tabs 44. The connecting tabs 44 are attached together by any convenient means such as locking screws (not shown).

Referring to FIG. 4 and FIG. 5 in combination, below the rigid boxes 30 for the entire portable drainage system 10 is located an impermeable flexible liner 46. The impermeable flexible liner 46 also extends upward to the top on the outside of all the rigid boxes 30 collected together. The impermeable flexible liner 46 is cushioned on either side thereof with cushioning layers 48 and 50, which cushioning layers are made of non-woven geotextile material. The cushioning layers 48 and 50 also extends up the outside of all the rigid boxes up to the top thereof, the same as the impermeable flexible liner 46.

The outer edges of the rigid boxes 30 are connected together by plates 52 and bolts 54 which screw into rigid boxes 30.

FIG. 4 shows a porous granular material 56 (such as sand) that is placed inside of expanded geosynthetic material 38 contained within rigid boxes 30. The porous granular material 56 is also located around the perforated header pipe 20. Once the portable drainage system 10 has been assembled with porous granular material 56 located within the expanded geosynthetic material 38, then high flexural strength mats 42 are placed across the tops 40 of the rigid boxes 30. Thereafter, heavy equipment such as a front end loader 58 may be driven on the top of the portable drainage system 10 without causing damage to the drainage system 10.

Figure 6:
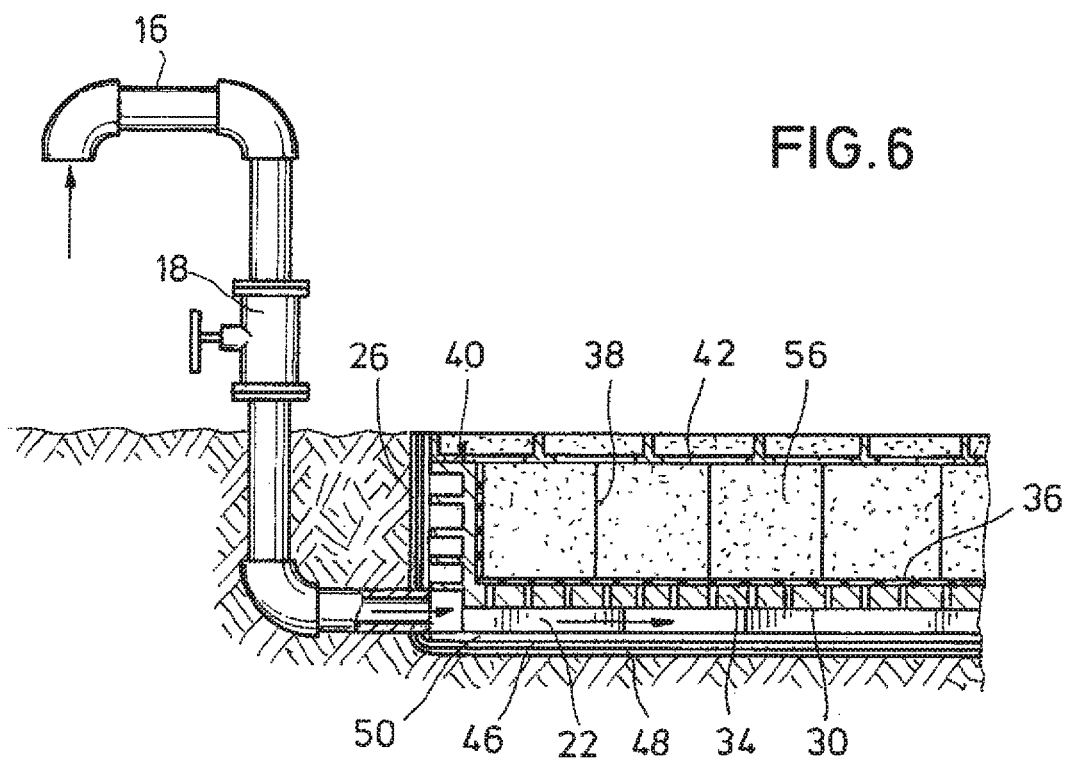
FIG. 6 is a partial sectional view of FIG. 1 along section lines 6-6.

Referring now to FIG. 6, if the valve 18 is opened, air inlet pipe 16 allows air to flow there through in the direction indicated by the arrows and into connecting cross slots 22 in the bottom 34 of the rigid boxes 30. Because the water flows downhill and the air inlet pipe 16 is on the upslope end 26, water will flow to the downslope end 28 where the perforated header pipe 20 is located within the porous granular material 56. See FIG. 3. The perforated header pipe 20 will take the drained water (or decant) away for suitable disposal in a drainage pond (not shown) or some other off site location.

Figure 7:
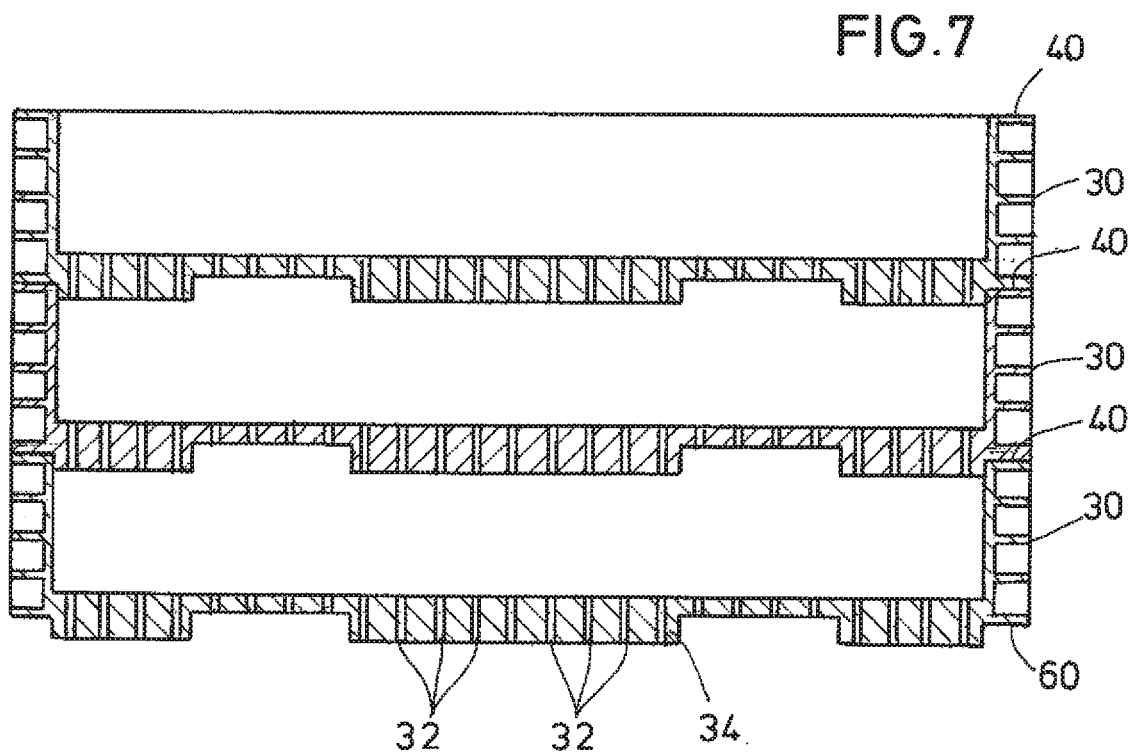
FIG. 7 is a sectional view of the rigid boxes being stacked for shipment.

During movement between different sites, rigid boxes 30 are shown FIG. 7 stacked together ready for shipment. The outer edges of the rigid boxes 30 have an indent 60 where the top 40 of a lower rigid box 30 will fit. Therefore, the rigid boxes 30 can be stacked multiple boxes high during transportation without scooting all over the transportation vehicle. Further in FIG. 7, the small vertical holes 32 through the bottoms 34 of the rigid boxes 30 are shown in more detail.

By using the portable drainage system 10 as just described, and due to the natural flowing of water downslope, a slight vacuum is created that will suck air into the air inlet pipe 16, through valve 18, and connecting cross slots 22 as the water flows downslope to the perforated header pipe 20 for removal from the portable drainage system 10. This natural aspiration without mechanical pumps creates an inexpensive portable drainage system for bulk granular materials.

We claim:

1. A portable drainage system for draining water from bulk granular material to be located on a flat surface sloped at approximately 2 to 3 degrees, said portable drainage system being strong enough to support the bulk granular material and loading equipment, said portable drainage system comprising:
    an impermeable flexible liner on said flat surface;
    cushioning layers above and below said impermeable flexible liner;
    a plurality of modular units including open top rigid boxes placed side-by-side on said impermeable flexible liner and said cushioning layers;
    vertical holes through bottoms of said rigid boxes;
    drainage fabric lining inside of said boxes, said drainage fabric having a close enough weave to prevent said bulk granular material from flowing therethrough, but not stopping flow of the water therethrough;
    an expanded geosynthetic material located on said drainage fabric inside of said rigid boxes and maintained in an expandable condition by being filled with some of said bulk granular material, said expanded geosynthetic material and said some of said bulk granular material filling said rigid boxes from said bottom to a top thereof;
    connecting cross slots in said bottom of said rigid boxes;
    on air inlet pipe connecting on an upslope side at said flat surface to said cross slots;
    perforated header pipe on a downslope side at said flat surface receiving (1) air from said inlet pipe via said cross slots, and (2) water from said bulk granular material flowing through said vertical holes in said bottom of said rigid boxes and via said cross slots; and
    a high flexural strength mat over said top of said rigid boxes and said expanded geosynthetic material filled with said bulk granular material;
    said perforated header pipe removing said water from said portable drainage system.

2. The portable drainage system for draining water from bulk granular material as recited in claim 1 further includes plates connecting outer walls of said rigid boxes together.

3. The portable drainage system for draining water from bulk granular material as recited in claim 2 wherein said air inlet pipe has a valve therein to control air flow there through.

4. The portable drainage system for draining water from bulk granular material as recited in claim 3 wherein a ramp at least partially surrounds said outer walls of said rigid boxes so that said loading equipment may drive thereon.

5. The portable drainage system for draining water from bulk granular material as recited in claim 4 wherein said impermeable flexible liner and said cushioning layers extends up said outer walls of said rigid boxes.

6. The portable drainage system for draining water from bulk granular material as recited in claim 5 wherein said perforated header pipe is located in some of said bulk granular material and partially wrapper on said downslope side with said impermeable flexible liner and said cushioning layers.

7. A method of draining fluids from bulk granular materials comprising the following steps:
- preparing a flat surface near a source of said bulk granular materials, said flat surface having a slope of approximately 2 to 3 degrees;
- first spreading a first non-woven geotextile layer on said flat surface;
- placing an impermeable flexible liner on top said first non-woven geotextile layer;
- second spreading a second non-woven geotextile layer on top said impermeable flexible liner;
- locating a plurality of modular rectangular units side-by-side on top said second non-woven geotextile layer, each of said modular rectangular units having a top open rigid box;
- lining an inside of said top open rigid box with drainage fabric that has a tight enough weave to keep said bulk granular material from flowing therethrough, but not so tight of a weave that water will not flow therethrough;
- expanding a geosynthetic material on said drainage fabric inside said top open rigid boxes with some of said bulk granular material, said geosynthetic material and said some of said bulk granular material filling said top open rigid boxes;
- overlapping said top rigid boxes with a plurality of high flexural strength mats;
- connecting said plurality of said flexural strength mats together;
- positioning a perforated header pipe on a downslope side of said flat surface adjacent said top open rigid boxes;
- introducing air through an air inlet pipe on an upslope side of flat surface to interconnecting cross slots in bottoms of said open top rigid boxes and subsequently to said perforated header pipe;
- draining water through holes in said bottom at said rigid boxes, via said interconnecting cross slots, and into said perforated header pipe for removal;
- dumping said bulk granular material on top of said flexural strength mats; and after draining fluids, removing said bulk granular material from top of said high flexural strength mats.

8. The method of draining fluids from bulk granular materials as recited in claim 7 includes the step of regulating air in said introducing step that is flowing through said air inlet pipe, said interconnecting cross slots and to said header pipe by a valve in said air inlet pipe to control airflow therethrough.

9. The method of draining fluids from bulk granular materials as recited in claim 8 includes the step of burying said perforated header pipe in some of said bulk granular material.

10. The method of draining fluids from bulk granular materials as recited in claim 9 includes the step of securing together said plurality of said modular rectangular units by attaching connecting plates on an outermost side of rigid boxes.

11. The method of draining fluids from bulk granular materials as recited in claim 10 includes the step of wrapping said outermost sides of said rigid boxes along with said perforated header pipe in (a) said first non-woven geotextile layer, (b) said impermeable flexible layer and (c) said second non-woven geotextile layer a drainage path being provided for said perforated header pipe.

12. The method of draining fluids from bulk granular materials as recited in claim 11 includes the step of providing a drainage path for said perforated header pipe.

\* \* \* \* \*